United States Patent
Lee

(10) Patent No.: US 8,298,088 B2
(45) Date of Patent: Oct. 30, 2012

(54) METHOD AND SYSTEM FOR OPERATING ONLINE 8-DIRECTION BATTLE GAME USING PERSONAL COMPUTER

(75) Inventor: Jong-Won Lee, Daegu (KR)

(73) Assignee: KOG, Daegu (KR)

( * ) Notice: Subject to any disclaimer, the term of this patent is extended or adjusted under 35 U.S.C. 154(b) by 267 days.

(21) Appl. No.: 12/760,722

(22) Filed: Apr. 15, 2010

(65) Prior Publication Data

US 2010/0267436 A1 Oct. 21, 2010

(30) Foreign Application Priority Data

Apr. 17, 2009 (KR) .................. 10-2009-0033544

(51) Int. Cl.
*A63F 13/12* (2006.01)

(52) U.S. Cl. ............................................. 463/42; 463/1

(58) Field of Classification Search .............. 463/40–42, 463/3–9
See application file for complete search history.

(56) References Cited

U.S. PATENT DOCUMENTS 8,113,960 B2 * 2/2012 Kaneko et al. .................. 463/42
2010/0114892 A1 * 5/2010 Kaneko et al. ................. 707/737

OTHER PUBLICATIONS

TG303, http://thegames.co.kr/main/newsview.php?category=201 &subcategory=3 &id=134328, 3 pages (Aug. 15, 2008).
PERFECT KO, http://media.daum.net/press/view.?cateid=1065 &newsid=20070822140016170&p=yonhappr, 2 pages (Jun. 9, 2010).

* cited by examiner

*Primary Examiner* — Masud Ahmed
(74) *Attorney, Agent, or Firm* — Fish & Richardson P.C.

(57) ABSTRACT

A method and system for operating an online 8-direction battle game using a personal computer (PC) are provided. The system operates the 8-direction battle game through interfacing with a game providing module to provide the 8-direction battle game in an online mode with a PC. The system includes an auto-targeting unit to automatically target an object to perform a battle against a character designated by a user of the PC in the 8-direction battle game, the object being within a predetermined range from a position of the character, and a game controller to automatically control a direction in which the character faces the object based on a distance between the object and the character.

17 Claims, 6 Drawing Sheets

FIG. 2

| Commands | Description |
|---|---|
| Sword worn | When gripping a sword with hands |
| D,D,D | Triple attack with a wooden sword |
| D when turning a character's back on an opponent | Rear attack |
| ↑+D directly after single or triple crushing blow | Consecutive high attack, strike down with a wooden sword, determination is made during a guard |
| ← or →+D,D directly after single or triple crushing blow | Consecutive middle attack |
| ↓+D directly after single or triple crushing blow | Consecutive low attack |
| ↑+D | Jump to strike down with a wooden sword, low avoidance |
| ←or→+D | Stab |
| ↓+D | Low attack |
| ↑+S | High capture |
| ←or→+S | Middle capture |
| ↓+S | Low capture |
| maintain input of ↑+A while being attacked after crushing blow | High counterattack |
| maintain input of ← or →+A while being attacked after crushing blow | Middle counterattack |
| maintain input of ↓+A while being attacked after crushing blow | Low counterattack |
| S during dashing | Low sweep with a weapon while sliding |
| D during dashing | Uppercut with a weapon |
| S during rolling | Low attack after rolling |
| D during rolling | Strike down after rolling |
| ↖ or ↗ +D | Roundhouse kick with a sword hilt |
| ↙ or ↘ +D | Low kick |
| S | Throw a wooden sword, change to a no-sword mode, stun when power is charged |
| Q | Be equipped with a sword |
| ↑+D during short-dashing | High heavy blow |
| ↑+S+D during high heavy blow | High consecutive lethal strike |
| ← or →+D collectible during short-dashing, cancel with A | Guard is impossible during full charging, default attack with a sword hilt, power charging when calling with A |
| Short-dash ↑+D directly after sword hilt attack | High slash |
| Short-dash ← or →+D directly after sword hilt attack | Middle slash |
| Short-dash ↓+D directly after sword hilt attack | Low slash |
| ↓+D,D during short-dashing | Low sweep after low stab, activate double blows with a single blow hit |
| ↑+S during short-dashing | High strong capture |
| ← or →+S during short-dashing | Middle strong capture, push an opponent with a sword |
| ↓+S during short-dashing | Low strong capture |
| ←or→+S+D | Twice consecutive slice, four lethal gauges are required |
| ↑ +S+D | Put a sword down, four lethal gauges are required |
| ↓ +S+D | Quintuple consecutive attack, eight lethal gauges are required |

FIG. 3

| Commands | Description |
|---|---|
| Sword | When being equipped with a sword in a body, default no-sword mode + additional skill |
| ↑+D,D directly after single or triple crushing blow in sword mode | Strike down with a wooden sword after high kick |
| ← or →+D,D directly after single or triple crushing blow in sword mode | Slash with a wooden sword after middle kick |
| ↓+D,D directly after single or triple crushing blow in sword mode | Uppercut with a wooden sword after low kick |
| Q in sword mode | Sword worn |
| ↑+D,S during short-dashing in sword mode | Air slice after high stab with a wooden sword |
| ← or →+D,S during short-dashing in sword mode | Middle slice after middle stab with a wooden sword |
| ↓+D,S during short-dashing in sword mode | Low slice after low stab with a wooden sword |

FIG. 4

| Commands | Description |
|---|---|
| No-sword | There is no sword |
| D,D,D in no-sword mode | Triple attack with high roundhouse kick after two consecutive punches |
| D when turning a character's back on an opponent in no-sword mode | Rear attack |
| ↑+D directly after single or triple crushing blow in no-sword mode | High kick |
| ← or →+D directly after single or triple crushing blow in no-sword mode | Middle kick, push an opponent away with a foot |
| ↓+D directly after single or triple crushing blow in no-sword mode | Low kick |
| ↑+D in no-sword mode | High attack, high kick |
| ← or →+D in no-sword mode | Middle attack, middle kick |
| ↓+D in no-sword mode | Low attack, low sweep |
| ↑+S in no-sword mode | High capture |
| ← or →+S in no-sword mode | Middle capture |
| ↓+S in no-sword mode | Low capture |
| maintain input of ↑+A while being attacked after crushing blow in no-sword mode | High counterattack |
| maintain input of ← or →+A while being attacked after crushing blow in no-sword mode | Middle counterattack |
| maintain input of ↓+A while being attacked after crushing blow in no-sword mode | Low counterattack |
| S during dashing in no-sword mode | Low kick after dashing |
| D during dashing in no-sword mode | Middle punch attack while dashing, determination is made late, guard is impossible |
| S in no-sword mode | HOLD |
| D,D,D during holding | Abdominal punch attack |
| ↑+S during holding | High capture |
| ← or →+S during holding | Middle capture |
| ↓+S during holding | Low capture |

METHOD AND SYSTEM FOR OPERATING ONLINE 8-DIRECTION BATTLE GAME USING PERSONAL COMPUTER

CROSS-REFERENCE TO RELATED APPLICATION

This application claims the benefit of Korean Patent Application No. 10-2009-0033544, filed on Apr. 17, 2009, in the Korean Intellectual Property Office, the disclosure of which is incorporated herein by reference.

BACKGROUND

1. Field of the Invention

The present invention relates to a method and system for operating an online 8-direction battle game using a personal computer (PC).

2. Description of the Related Art

An input device, such as a keyboard or a mouse, is typically used when a user plays a game using a game program or a game content provided over the Internet. The input device is included in a game execution device such as a PC.

Recently, an input device for exclusive use in games, for example a joystick or a joypad, has also been utilized in addition to a keyboard or a mouse. Such an input device for exclusive use in games enables a user to enjoy a game in a more realistic manner, compared to using a keyboard or a mouse. Accordingly, a great number of users utilize the input device for exclusive use in games.

In a battle game such as an arcade game, a method of operating a stick such as a joystick is used so that a user may enter a desired command by manipulating the stick in order to use skills of a character.

In the case of a PC game, users may typically enter commands for use of skills of the character using a combination of direction keys such as arrow keys on a keyboard (for example, ↓, ↘, →, and the like) and buttons on a keyboard (for example, P, K and the like).

For example, to implement a command '↓↘→↓↘→+P', a user may consecutively input direction commands ↓, ↘, →, ↓, ↘, →, and button P using a stick. In this instance, even when six steps are required to set the command by the stick, the command enables the user to easily manipulate and operate the stick.

Alternatively, when the user desires to enter the command '↓↘→↓↘→+P' using a keyboard included in a PC, he or she needs to 'smoothly but rapidly' press direction keys ↓, →, so that the input is recognized as a diagonal direction, namely ↘. In other words, the user needs to input only direction keys ↓, →, ↓, → and button P, instead of inputting ↓, ↘, →, ↓, ↘, →, and button P.

Additionally, the user continues to only input via a button to use skills of a character in an online 8-direction battle game, and thus it is easy to utilize the skills using the keyboard of the PC.

A combo-type skill is useful to attack a predetermined rear part of an opponent, however, it is not possible to independently use a rear attack skill. In addition, when a user desires to enter a command using the keyboard, direction keys of the keyboard are used to utilize skills. However, in this instance, a combination of direction keys and buttons is only used to activate the skills, not to select a part of a battle opponent to which the attack skill is to be applied. Additionally, since it is impossible to enter a command '→↓↘+P' using the keyboard, direction keys ↓, →, ↓, → are mixed and combined.

Moreover, in a conventional system, a command to apply skills of a character is recognized as one of characteristics pertaining to the character, and thus a user needs to memorize commands individually, thereby causing an inconvenience for the user.

SUMMARY

An aspect of the present invention provides a system and method for operating an 8-direction battle game in order to minimize an inconvenience caused by setting an attack direction.

Another aspect of the present invention also provides a system and method for operating an 8-direction battle game which enable a user to select a skill application part of a battle opponent or of a character in order to apply a skill to the selected skill application part in a battle with the battle opponent.

Another aspect of the present invention also provides a system and method for operating an 8-direction battle game which enable a user to intuitively operate the 8-direction battle game and for performing uniform operations to utilize skills of a character in order to play the 8-direction battle game using skills suitable for characteristics of each character without additional training.

According to an aspect of the present invention, there is provided a method of operating an 8-direction battle game in a game operating system to operate the 8-direction battle game through interfacing with a game providing module to provide the 8-direction battle game in an online mode with a personal computer (PC), the system comprising an auto-targeting unit, a command receiver, and a game controller, the method including automatically targeting, by the auto-targeting unit, an object to perform a battle against a character designated by a user of the PC in the 8-direction battle game, the object being within a predetermined range from a position of the character, and automatically controlling, by the game controller, a direction in which the character faces the object based on a distance between the object and the character.

The method may further include receiving, by the command receiver, a command input by the user from the PC to apply a skill to the object, and determining, by the game controller, a skill application part of the character or of the object to which the skill is to be applied, in response to the input command and controlling an action of the skill to be applied to the determined part.

According to another aspect of the present invention, there is provided an 8-direction battle game operating system to operate an 8-direction battle game through interfacing with a game providing module to provide the 8-direction battle game in an online mode with a PC, the system including an auto-targeting unit to automatically target an object to perform a battle against a character designated by a user of the PC in the 8-direction battle game, the object being within a predetermined range from a position of the character, and a game controller to automatically control a direction in which the character faces the targeted object based on a distance between the targeted object and the character.

The system may further include a command receiver to receive a command input by the user from the PC to apply a skill to the targeted object. The game controller may determine a skill application part of either the character or the object to which the skill is to be applied, in response to the input command, and may control an action of the skill to be applied to the determined part.

The command may include a skill application command defined to apply at least one of a movement skill to move the character, a defense skill to defend the character against an attack of the object, a capture skill to capture the object, and an attack skill to attack the object; and a skill application part command defined to select at least one of a defense part of the character to defend against the attack of the object, a capture part of the object to capture, and an attack part of the object to attack.

The skill application part may be divided into either an upper part and a lower part, or into an upper part, a middle part and a lower part.

The skill application command may be input by the user using at least one of direction keys on a keyboard of the PC, letter keys on a keyboard of the PC, and a combination of the direction keys on a keyboard of the PC and the letter keys on a keyboard of the PC. The skill application part command may be input by the user using at least one of the direction keys on a keyboard of the PC, and a combination of the keys direction keys on a keyboard of the PC and the letter keys on a keyboard of the PC.

According to the aspect of the present invention, a battle opponent may be automatically targeted and a direction in which a character faces the battle opponent may be automatically controlled for use of a skill, such as an attack skill, a defense skill or the like, and thus it is possible to minimize an inconvenience caused by setting an attack direction in an 8-direction battle game and to provide a keyboard that is an input device for a PC with an optimized operating environment.

According to the aspect of the present invention, a skill application part of either a battle opponent or of a character may be selected and an operating environment to apply a skill to the selected part may be provided, and accordingly it is possible to provide a greater variety of skills in an 8-direction battle game.

According to the aspect of the present invention, characteristics of a command given to each characters may be removed, and thus it is possible to easily play any character.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 2 to 4 are views illustrating examples of battle skills and commands defined in an 8-direction battle game operating system according to an embodiment of the present invention;

DETAILED DESCRIPTION

Figure 1:
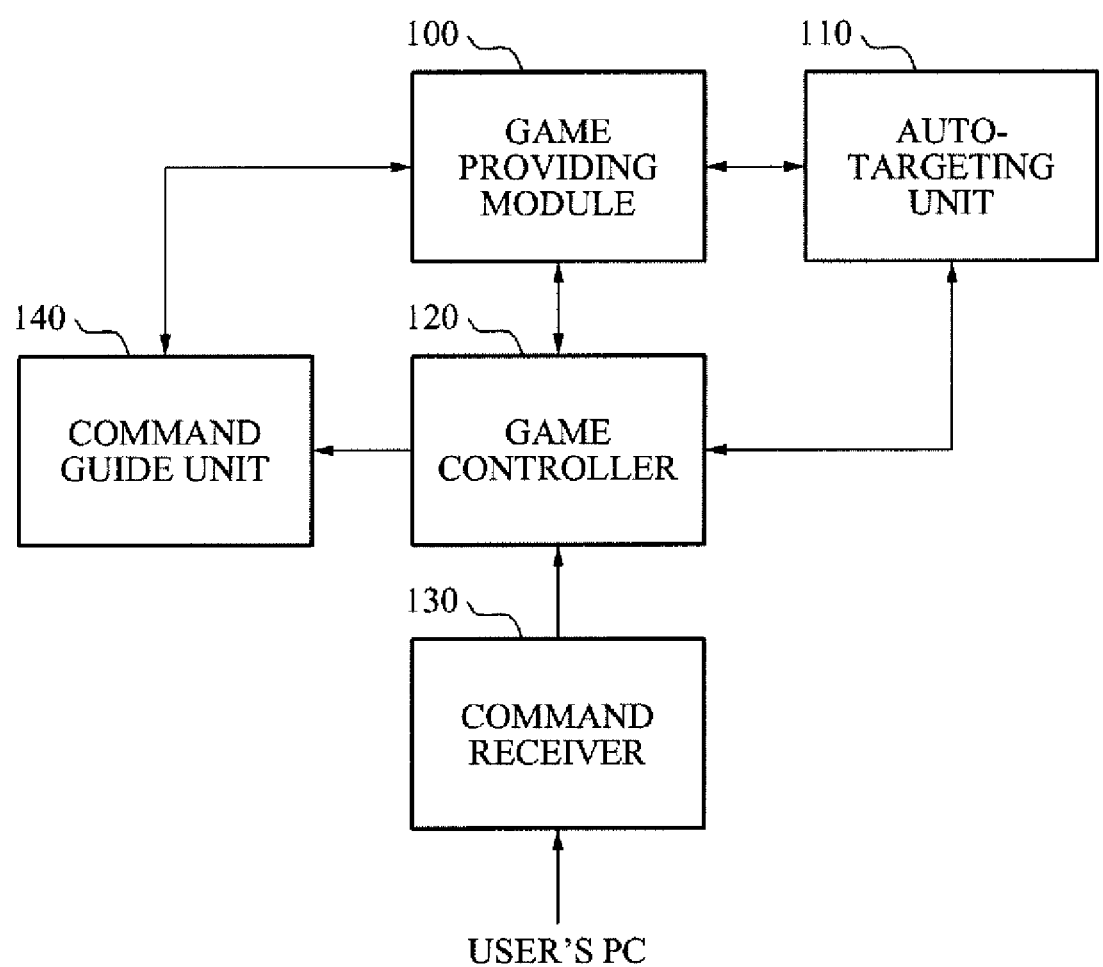
FIG. 1 is a diagram illustrating a configuration of an 8-direction battle game operating system according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 is a diagram illustrating a configuration of an 8-direction battle game operating system according to an embodiment of the present invention.

An embodiment of the present invention provides the 8-direction battle game operating system to operate an 8-direction battle game by interfacing with a game providing module 100 to provide the 8-direction battle game online. The game providing module 100 may function as a game server to maintain an access to a personal computer (PC) of a user and to provide the 8-direction battle game in an online mode with the PC.

The 8-direction battle game operating system of FIG. 1 may function to provide interfacing between the PC and the game providing module 100 during gameplay of the 8-direction battle game. The 8-direction battle game operating system may be either combined with or separated from the game providing module 100.

Referring to FIG. 1, the 8-direction battle game operating system may include an auto-targeting unit 110, a game controller 120, a command receiver 130 and a command guide unit 140.

The auto-targeting unit 110 may determine a position of a character designated by the user in a battlefield of the 8-direction battle game provided by the game providing module 100, and may automatically target a battle opponent (namely, an object) to perform a battle against the character based on the determined position of the character. The auto-targeting unit 110 may select a battle opponent located in a position closest to the character from among battle opponents, and may set the selected battle opponent as the object. Here, the battle opponents correspond to enemy characters and are within a predetermined range from the position of the character.

The game controller 120 may automatically control a direction in which the character faces the object, based on a distance between the object and the character. When the distance between the object and the character is within a predetermined distance, the game controller 120 may control the direction so that the character may face the object at all times while the predetermined distance is being maintained. When the object or character moves and when the distance between the object and the character exceeds the predetermined distance, the auto-targeting unit 110 may select another battle opponent as a new object after canceling the targeting of the object under the control of the game controller 120.

In the 8-direction battle game, skills applicable by the user have been defined in advance, for example defending, capturing, attacking, moving or the like. In particular, a skill application part of the character or of the object may be selected so that skills may be activated and applied to the selected skill application part.

The command guide unit 140 may provide a manual to provide guidance about the overall description of the 8-direction battle game. The manual may be stored and maintained in a storage means so that when a user requests the manual, the command guide unit 140 may provide the stored manual through a game screen provided by the game providing module 100. Specifically, the command guide unit 140 may provide a command guide, for example a description of skills available in a battle, commands defined in advance for each skill and for each skill application part, and a command input method.

These commands may include skill application commands and skill application part commands. The skill application commands defined for each skill may enable a user to utilize a movement skill to move the character, a defense skill to defend the character against an attack of the object, a capture skill to capture the object, and an attack skill to attack the object. The skill application part commands defined for each skill application part may enable a user to select a defense part of the character to defend against the attack of the object, a capture part of the object to capture, and an attack part of the object to attack.

The skill application commands may be input using at least one of a direction key on a keyboard of a PC, a letter keys on a keyboard of a PC, and a combination of the direction keys and the letter keys on a keyboard.

For example, buttons 'A,' 'D,' and 'S' may be defined as commands to apply the defense skill, the capture skill, and the attack skill, respectively. At least one of the direction keys (for example, ←, ↓, →, ↑) and letter keys may be defined as commands to apply the movement skill. A dash skill that is a type of the movement skill may be used by maintaining a state in which a direction key '→' is input twice consecutively. In other words, a command for the dash skill is defined as '→→maintain.' Additionally, '→→' may be defined as a command to apply a short dash skill. A rolling skill may be used by pressing button 'A' while the key '→' are being input twice consecutively. In other words, a command for the rolling skill is defined as '→→maintain+A.'

In the 8-direction battle game, the skill application part may be divided and defined into an upper part and a lower part corresponding to a head and a leg, respectively, or into an upper part, a middle part and a lower part corresponding to a head, a heart and a leg, respectively. The skill application part command may be input using at least one of direction keys on the keyboard of the PC, or using a combination of the keys.

For example, a direction key '↑' may be defined as a command to select an upper part, and direction keys '←,' or '→' may be defined as a command to select a middle part. Additionally, a direction key '↓' may be defined as a command to select a lower part.

In the embodiment of the present invention, the skill application part commands and the skill application commands may be combined and defined, so that a user may select a skill application part and a skill to be applied to the selected skill application part when the character faces the object.

For example, '↑+S,' '←+S,' and '↓+S' may be defined as commands for high attack, middle attack and low attack, respectively. Additionally, '↑+D,' '←+D,' and '←+D' may be defined as commands for high capture, middle capture and low capture, respectively. '↑+A,' '←+A,' and '↓+A' may be defined as commands for high defense, middle defense and low defense, respectively.

Additionally, according to an embodiment of the present invention, whether the skill application command and skill application part command are inputtable may be determined based on a movement state of the character moved by the movement skill.

The movement state of the character may be broadly divided into a movement state where both of the skill application command and skill application part command are inputtable, and a movement state where only the skill application command is inputtable. The movement skill may include dashing, waiting, short-dashing, and rolling, and thus the movement state of the character may be expanded.

For example, when the movement state of the character is able to be changed by the movement skill such as dashing, waiting, short-dashing, and rolling, the skill application command may be input, however, the skill application part command may not be input after the movement state is changed by dashing. Also, after the movement state is changed by waiting, rolling, and short-dashing, both of the skill application command and skill application part command may be input.

Therefore, a greater variety of skills may be defined based on the state of the character in the 8-direction battle game which enables a user to select a skill application part and apply a skill to the selected skill application part.

FIGS. 2 to 4 are views illustrating examples of battle skills and commands defined in an 8-direction battle game operating system according to an embodiment of the present invention The commands are defined using a combination of skill application commands and skill application part commands. FIG. 2 illustrates commands for each skill available in a sword worn mode where a character currently grips a sword by hand, FIG. 3 illustrates commands for each skill available in a sword mode where a character is currently equipped with a sword, and FIG. 4 illustrates commands for each skill available in a no-sword mode where a character does not have any sword.

Figure 5:
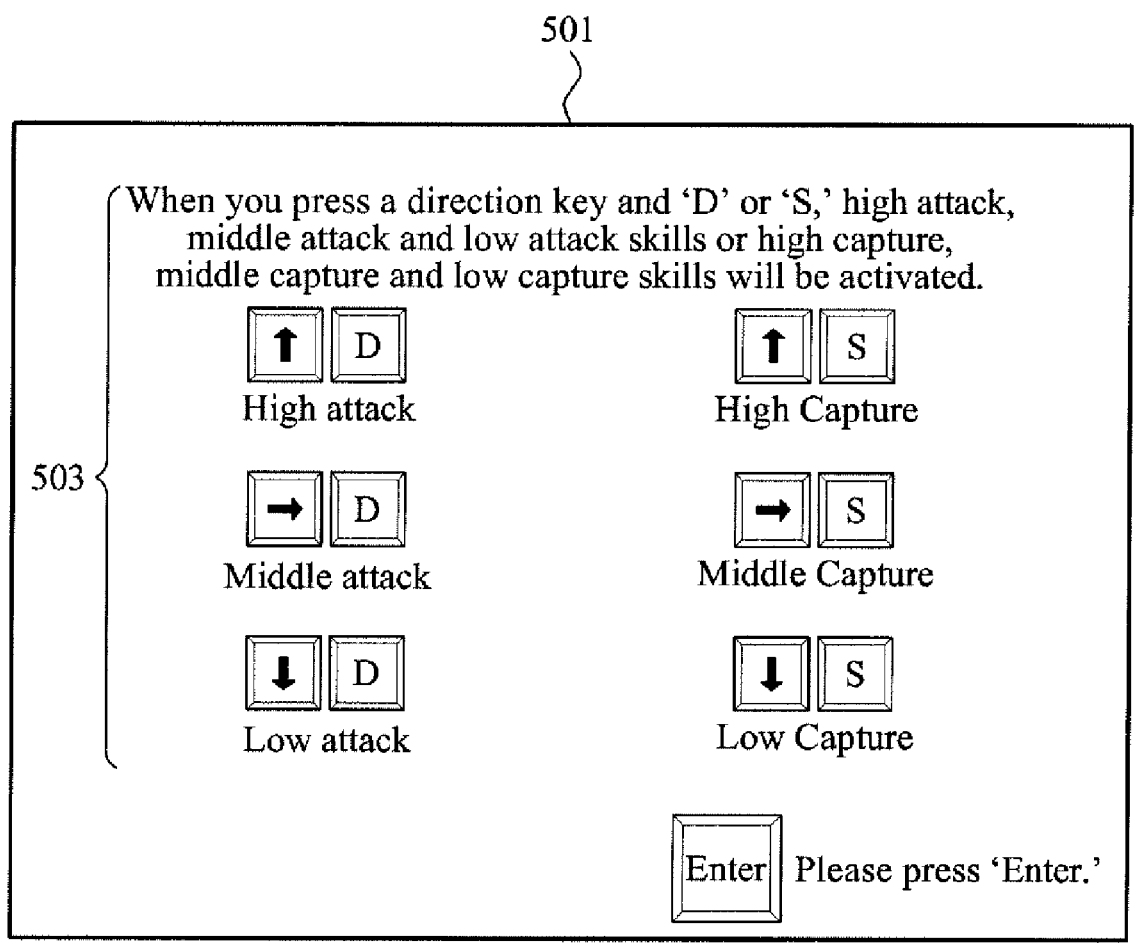
FIG. 5 is a view illustrating an example of a screen to provide a command guide, according to an embodiment of the present invention.

FIG. 5 is a view illustrating an example of a screen to provide a command guide, according to an embodiment of the present invention.

The command guide unit 140 may provide guidance about how to execute commands defined for each skill as described above, on an area 503 of the command guide screen 501 as illustrated in FIG. 5.

The command receiver 130 may receive a user command related to an 8-direction battle game from the PC. Here, the user command may be input by a user to apply a skill to the object. In response to the command received by the command receiver 130, the game controller 120 may determine a skill application part of the character or of the object, and may control an action of the skill to be applied to the determined part, while the character faces the object. For example, when the command '↓+D' is received from the PC, the game controller 120 may control the game providing module 100 so that the character may attack the lower part of the object (for example, a leg of the object). Alternatively, when the command '↑+A' is received from the PC, the game controller 120 may control the game providing module 100 so that the character may defend its upper part (for example, a head) against an attack of the object.

Figure 6:
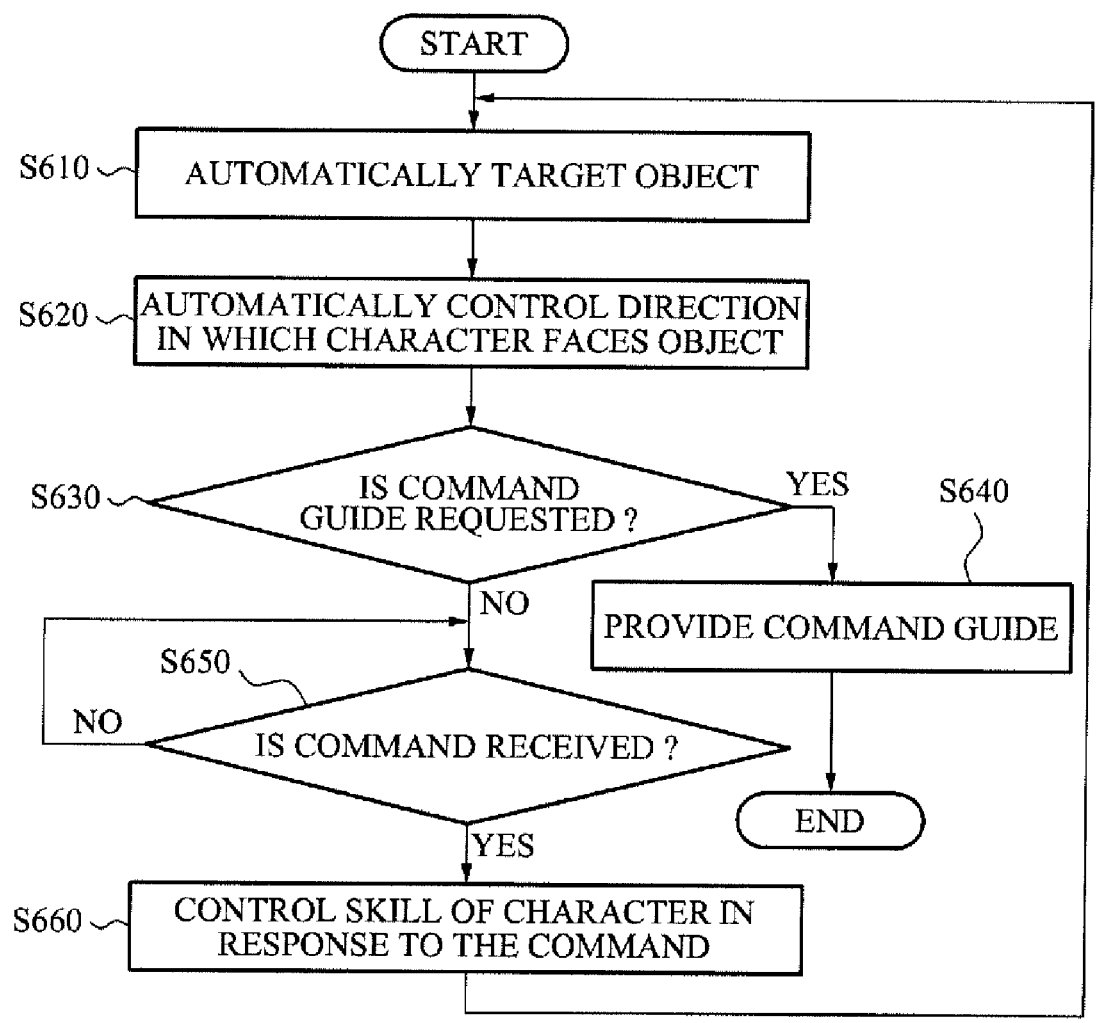
FIG. 6 is a flowchart illustrating an 8-direction battle game operating method according to an embodiment of the present invention.

FIG. 6 is a flowchart illustrating an 8-direction battle game operating method according to an embodiment of the present invention.

Hereinafter, the 8-direction battle game operating method is described with reference to FIG. 6. Herein, the 8-direction battle game operating method may be performed by the 8-direction battle game operating system shown in FIG. 1

In the 8-direction battle game operating system, the auto-targeting unit 110 determines a position of a character designated by a user, and automatically targets a battle opponent (namely, an object) to perform a battle against the character based on the determined position of the character in operation S610. In operation S610, the auto-targeting unit 110 selects a battle opponent located in a position closest to the character from among battle opponents, and sets the selected battle opponent as the object. Here, the battle opponents correspond to enemy characters and are within a predetermined range from the position of the character.

Additionally, the game controller 120 automatically controls a direction in which the character faces the object, based on a distance between the object and the character in operation S620. In operation S620, when the distance between the object and the character is within a predetermined distance, the game controller 120 may control the direction so that the character may face the object at all times while the predetermined distance is being maintained. Additionally, when the object or character moves and when the distance between the object and the character exceeds the predetermined distance, the auto-targeting unit 110 may select another battle opponent as a new object after canceling the targeting of the object.

In response to a user's request, the command guide unit 140 provides a command guide, for example a description of skills available in a battle, commands defined in advance for each skill and for each skill application part, and a command input method in operations S630 and S640.

These commands may include skill application commands and skill application part commands. The skill application commands defined for each skill may enable a user to utilize a movement skill to move the character, a defense skill to defend the character against an attack of the object, a capture skill to capture the object, and an attack skill to attack the object. The skill application part commands defined for each skill application part may enable a user to select a defense part of the character to defend against the attack of the object, a capture part of the object to capture, and an attack part of the object to attack.

The skill application commands may be input using at least one of direction keys on a keyboard of the PC, letter keys on a keyboard of the PC, and using a combination of the direction keys on a keyboard of the PC and the letter keys on a keyboard of the PC. The skill application part commands may be input by the user using at least one of the direction keys on a keyboard of the PC, and a combination of the direction keys on a keyboard of the PC and the letter keys on a keyboard of the PC. Additionally, the skill application commands and the skill application part commands may be combined according to skills.

The command receiver 130 receives a user command input by a user to apply a skill to the object in operation S650. In response to the command received by the command receiver 130, the game controller 120 determines a skill application part of either the character or of the object, and controls an action of the skill to be applied to the determined part, while the character faces the object in operation S660.

Therefore, depending on embodiments of the present invention, an operating environment for an online 8-direction battle game may be provided to automatically target a battle opponent and automatically control a direction in which a character faces in order to use a skill. Also, an operating environment for an online 8-direction battle game may be provided to select a part of either a character or an object and apply a skill to the selected part.

The embodiments of the present invention may include computer-readable media including program instructions to implement various operations embodied by a computer. The media may also include, alone or in combination with the program instructions, data files, data structures, and the like. The program instructions recorded on the media may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of operating an 8-direction battle game in a game operating system to
    operate the 8-direction battle game through interfacing with a game providing module to provide the 8-direction battle game in an online mode with a personal computer (PC), the system comprising an auto-targeting unit, a command receiver, and a game controller, the method comprising:
    automatically targeting, by the auto-targeting unit, an object to perform a battle against a character designated by a user of the PC in the 8-direction battle game, the object being within a predetermined range from a position of the character; and
    automatically controlling, by the game controller, a direction in which the character faces the object based on a distance between the object and the character; the method of further comprising:
    receiving, by the command receiver, a command input by the user from the PC to apply a skill to the object; and
    determining, by the game controller, a skill application part of the character or of the object to which the skill is to be applied, in response to the input command, and controlling an action of the skill to be applied to the determined part; wherein the command comprises:
    a skill application command defined to apply at least one of a movement skill to move the character, a defense skill to defend the character against an attack of the object, a capture skill to capture the object, and an attack skill to attack the object; and
    a skill application part command defined to select at least one of a defense part of the character to defend against the attack of the object, a capture part of the object to capture the object, and an attack part of the object to attack the object.

2. The method of claim 1, wherein the automatically targeting of the object comprises selecting a battle opponent located in a position closest to the character from among battle opponents being in the predetermined range, and setting the selected battle opponent as the object.

3. The method of claim 1, wherein the automatically controlling of the direction comprises controlling the direction so that the character faces the object at all times, when the distance between the object and the character is within a predetermined distance.

4. The method of claim 3, wherein the automatically targeting of the object comprises selecting another battle opponent as a new object after canceling the targeting of the object, when the distance between the object and the character exceeds the predetermined distance.

5. The method of claim 1, wherein the skill application part is divided into either an upper part and a lower part, or into an upper part, a middle part and a lower part.

6. The method of claim 1, wherein the skill application command is input by the user using at least one of direction keys on a keyboard of the PC, letter keys on a keyboard of the PC, and a combination of the direction keys on a keyboard of the PC and the letter keys on a keyboard of the PC, and the skill application part command is input by the user using at least one of the direction keys on a keyboard of the PC, and using a combination of the direction keys on a keyboard of the PC and the letter keys on a keyboard of the PC.

7. The method of claim 1, wherein whether the skill application command and skill application part command are inputtable is determined depending on a movement state of the character moved by the movement skill.

8. The method of claim 7, wherein the movement state of the character comprises a movement state where both of the skill application command and skill application part command are inputtable, and a movement state where only the skill application command is inputtable.

9. A computer readable recording medium storing a program to implement the method of claim 1.

10. An 8-direction battle game operating system to operate an 8-direction battle game through interfacing with a game providing module to provide the 8-direction battle game in an online mode with a personal computer (PC), the system comprising:

an auto-targeting unit to automatically target an object to perform a battle against a character designated by a user of the PC in the 8-direction battle game, the object being within a predetermined range from a position of the character; and a game controller to automatically control a direction in which the character faces the object based on a distance between the object and the character; the system further comprising:

a command receiver to receive a command input by the user from the PC to apply a skill to the object, wherein the game controller determines a skill application part of either the character or the object to which the skill is to be applied, in response to the input command, and controls an action of the skill to be applied to the determined part; wherein the command comprises:

a skill application command defined to apply at least one of a movement skill to move the character, a defense skill to defend the character against an attack of the object, a capture skill to capture the object, and an attack skill to attack the object; and a skill application part command defined to select at least one of a defense part of the character to defend against the attack of the object, a capture part of the object to capture, and an attack part of the object to attack.

11. The system of claim 10, wherein the auto-targeting unit selects a battle opponent located in a position closest to the character from among battle opponents being in the predetermined range, and sets the selected battle opponent as the object.

12. The system of claim 10, wherein the game controller controls the direction so that the character faces the object at all times, when the distance between the object and the character is within a predetermined distance.

13. The system of claim 12, wherein the auto-targeting unit selects another battle opponent as a new object after canceling the targeting of the object, when the distance between the object and the character exceeds the predetermined distance.

14. The system of claim 1, wherein the skill application part is divided into either an upper part and a lower part, or into an upper part, a middle part and a lower part.

15. The system of claim 1, wherein the skill application command is input by the user using at least one of direction keys on a keyboard of the PC, letter keys on a keyboard of the PC, and a combination of the direction keys on a keyboard of the PC and the letter keys on a keyboard of the PC, and the skill application part command is input by the user using at least one of the direction keys on a keyboard of the PC, and a combination of the direction keys on a keyboard of the PC and the letter keys on a keyboard of the PC.

16. The system of claim 1, wherein whether the skill application command and skill application part command are inputtable is determined depending on a movement state of the character moved by the movement skill.

17. The system of claim 16, wherein the movement state of the character comprises a movement state where both of the skill application command and skill application part command are inputtable, and a movement state where only the skill application command is inputtable.

* * * * *